(12) United States Patent
Duerig et al.

(10) Patent No.: US 8,023,393 B2
(45) Date of Patent: Sep. 20, 2011

(54) METHOD AND APPARATUS FOR REDUCING TIP-WEAR OF A PROBE

(75) Inventors: Urs T. Duerig, Rueschlikon (CH); Bernd W. Gotsmann, Horgen (CH); Armin W. Knoll, Adliswill (CH); Mark Alfred Lantz, Adliswill (CH)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 12/116,320

(22) Filed: May 7, 2008

(65) Prior Publication Data

US 2008/0316904 A1   Dec. 25, 2008

(30) Foreign Application Priority Data

May 10, 2007  (EP) ..................................... 07107967

(51) Int. Cl.
*G11B 3/00*  (2006.01)
(52) U.S. Cl. .................... 369/126; 369/44.11; 369/13.05
(58) Field of Classification Search ................. 369/126, 369/100, 44.11, 101, 13.05; 73/105; 225/2; 250/234
See application file for complete search history.

(56) References Cited

U.S. PATENT DOCUMENTS

| | | | | |
|---|---|---|---|---|
| 5,481,528 | A * | 1/1996 | Eguchi et al. | 369/126 |
| 5,751,685 | A * | 5/1998 | Yi | 369/126 |
| 5,808,977 | A * | 9/1998 | Koyanagi et al. | 369/43 |
| 7,055,378 | B2 * | 6/2006 | Su et al. | 73/105 |
| 7,161,875 | B2 * | 1/2007 | Sharma | 369/13.05 |
| 7,319,224 | B2 * | 1/2008 | Park et al. | 250/306 |
| 7,522,511 | B2 * | 4/2009 | Gotsmann et al. | 369/126 |
| 7,663,094 | B2 * | 2/2010 | Yoo et al. | 250/234 |
| 2004/0252590 | A1 * | 12/2004 | Sharma | 369/13.05 |
| 2006/0002272 | A1 * | 1/2006 | Ishii et al. | 369/100 |
| 2007/0039990 | A1 * | 2/2007 | Kemmerer et al. | 225/2 |
| 2008/0223119 | A1 * | 9/2008 | Phan et al. | 73/105 |
| 2008/0225676 | A1 * | 9/2008 | Gotsman et al. | 369/126 |

* cited by examiner

*Primary Examiner* — Thuy Pardo
(74) *Attorney, Agent, or Firm* — Gail H. Zarick; Lisa M. Yamonaco; Lily Neff

(57) ABSTRACT

The present invention relates to a method of reducing the wear of a tip of a probe when the tip is in contact with a surface of a substrate and when the probe is mounted on a support structure. A method is provided where a load force is applied to the probe, thereby causing the tip to be maintained substantially in contact with the substrate surface and a modulation step where the e magnitude of the load force is modulated at a modulation frequency. The modulation frequency is selected to be greater than a fundamental vibration frequency of the support structure on which the probe is mounted.

7 Claims, 7 Drawing Sheets

- load force < 5nN
- scan velocity ~50µm/s
- scan distance ~13m
Wear volume = $\pi r^2 h/3$
r=34.5nm, h=130nm
V=1.62E5 nm$^3$
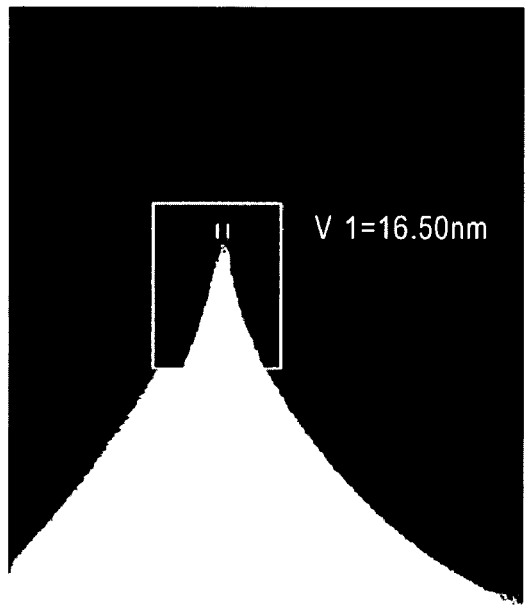
V 1=16.50nm
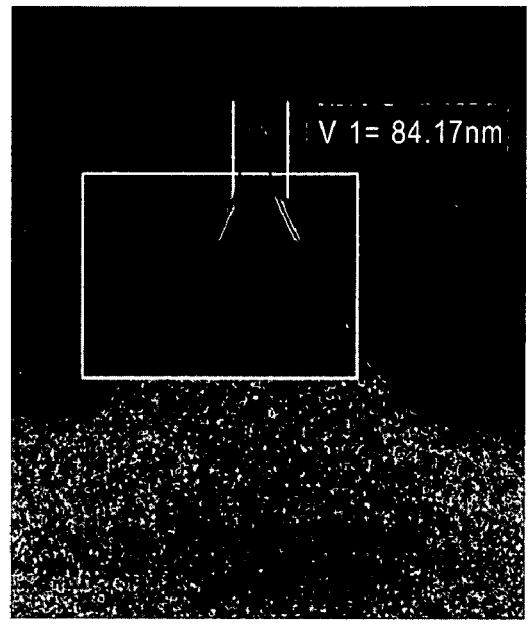
V 1= 84.17nm
FIG. 7A
FIG. 7B
Before Wear Test
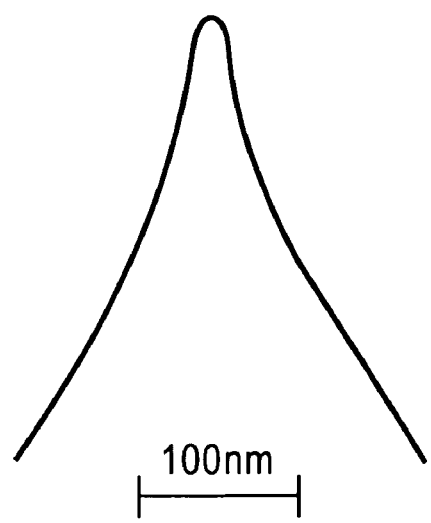
100nm
After Wear Test
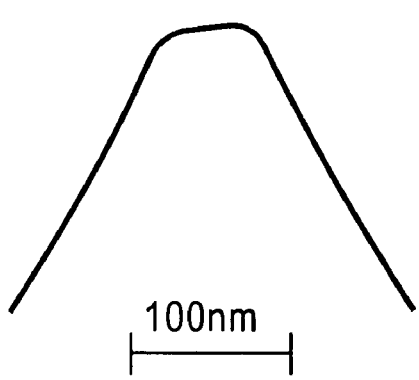
100nm
FIG. 7C
FIG. 7D

- Scan velocity 1.5mm/s
- RH ~0% (<2ppm molecules H$_2$O in N$_2$ gas)
- Load force ~5nN
- scan distance ~750m Wear volume = $\pi r^2 h/3$
r=16nm, h=56nm
V=1.50E4 nm$^3$ Before Wear Test

|← 100nm →|

After Wear Test

|← 100nm →|

- Modulation : 500kHz 5V sinusoid on substrate
- Scan velocity 1.5mm/s
- RH ~0% (<2ppm molecules H₂O in N₂ gas)
- Load force ~5nN
- scan distance ~700m Wear volume = $\pi r^2 h/3$
r=4.5nm, h=8.4nm
V=178nm³

Before Wear Test

After Wear Test

METHOD AND APPARATUS FOR REDUCING TIP-WEAR OF A PROBE

CROSS-REFERENCE TO RELATED APPLICATION

This application claims priority under 35 U.S.C. §119 from Switzerland Patent Application No. 07107967.7 filed 10 May 2007, the entire contents of which are incorporated herein by reference.

FIELD OF THE INVENTION

The present invention relates to a method and an apparatus for reducing the wear of the tip of a probe interacting with a surface by being in contact therewith. More particularly, the present invention relates to methods for reducing the tip-wear of probes used in scanning-probe microscopy and its applications.

BACKGROUND OF THE INVENTION

Generally, in scanning probe microscopy, a probe with a nanometer-sized tip is scanned relative to a substrate surface that is to be investigated. In one mode of operation, the so-called contact mode of operation, the tip of the probe is scanned in mechanical contact with the substrate surface. The tip performs a sensing function of the interaction forces between itself and the substrate surface at each scan point. This information is then used for mapping specific characteristics of the substrate surface by yielding an image thereof. The magnitudes of the interaction forces that are sensed by the tip are relatively small, typically on the order of 1 nN to 1 μN. In order to detect them, transduction of the interaction forces is achieved by the choice of an appropriate force sensor, for example, in local probe microscopy; the force sensor is a cantilever spring on which the probe is mounted.

The interaction forces between the tip and the substrate surface depend on their respective physical and/or chemical characteristics. For example, if the tip comprises a magnetic material, it can be applied for sensing magnetic interactions with magnetic particles present in the substrate. Alternatively, if the tip comprises a conducting material, it can be applied for sensing electrostatic interactions with the substrate surface by applying a voltage between the tip and the substrate. For the investigation of the chemical properties of the substrate surface, the tip can be functionalized by adsorbing chemically active species thereon in order to sense specific chemical interactions with the substrate surface. Alternatively, it can be made of an inert insulating material thereby facilitating the topography of the substrate surface to be mapped. This can be done by exploiting hard-core repulsion forces between the tip and the surface. The tip may also be used to perform a combination of the aforementioned sensing principles.

As mentioned earlier, the magnitude of the interaction forces between the tip and the substrate surface are small and typically on the order of 1 nN to 1 μN. However, taking into account the nanometer scale dimensions of the tip and assuming that the area of contact between the tip and the substrate surface is on the order of 1 $nm^2$ to 1000 $nm^2$, the magnitude of the stress that is locally exerted on both the substrate surface and the tip can reach relatively high values and may be on the order of MPa to GPa. If the tip is displaced laterally over the substrate surface, shear forces of a similar order of magnitude are generated. Shear stress is considered to be one of the main causes of irreversible and undesirable alterations of the tip and/or the substrate surface, such alterations are typically referred to as wear. Wear can be manifested in a variety of ways. The following examples include tip-blunting; modification of the substrate surface topography which may, in some cases, be the irreversible damage of the substrate surface; loss of chemical and/or physical functionality of the tip, etc. Generally, wear is associated with the unintended displacement of atoms or molecules at the tip or the substrate surface.

It is known that wear may be reduced by using an alternative mode of operation in which the tip and the substrate are not maintained in contact during scanning but instead intermittently brought into contact with each other at the fundamental resonance frequency of the support structure onto which the probe is mounted. In this so-called tapping mode of operation, the reduction in wear can be attributed to the dynamics of the interdigitated network that forms between the tip and the substrate surface on an atomic/molecular scale when they are in contact. By periodically removing the tip from the substrate surface, the interdigitated network is allowed to disentangle, thereby relaxing the shear stress that accumulates between them when they are scanned in contact with each other.

Some problems associated with the tapping mode include: the sensing of bandwidth when bandwidth is dependent on and, therefore, limited by, the resonance frequency of the support structure onto which the probe is mounted. In order to cope with the vibration amplitude of the probe, the dynamic range of the sensing channel is chosen to be broad and control of the vibration amplitude is done by specialized and complicated control-loop schemes.

Accordingly, it is a challenge to increase the lifetime and performance of probes in applications where they are operated in contact with respect to a substrate surface.

SUMMARY OF THE INVENTION

The present invention provides a method of reducing the wear of a tip of a probe is provided when the tip is in contact with a surface of a substrate, and where the probe is mounted on a support structure. The method comprises a loading step in which a load force is applied to the probe, thereby to cause the tip to be maintained substantially in contact with the substrate surface, and a modulation step in which the magnitude of the load force is modulated at a modulation frequency, the modulation frequency being chosen to be greater than a fundamental vibration frequency of the support structure on which the probe is mounted. By modulating the magnitude of the load force at a modulation frequency, when the frequency is chosen to be greater than a fundamental vibration frequency/natural frequency of the support structure of the probe, the wear of the tip is found to be reduced compared to other known modes of operation in probe microscopy and/or its applications. One example can be the contact-mode. Unlike the tapping mode of operation, the tip is maintained in contact with the substrate surface so specialized control loop schemes tuned to the resonance frequency of the support structure of the probe need not be implemented in an embodiment of the present invention. Furthermore, the modulation frequency at which modulation of the loading force is chosen is to be such that the probe is physically unable to follow the variation of the force as a function of time and so remains substantially in contact with the substrate surface.

The modulation frequency can be preferably be chosen to be greater than a contact resonant frequency of the support structure, which is the resonant frequency of the support structure when the tip of the probe is in contact with the substrate surface. When the tip is brought into contact with the substrate surface, the resonant frequency of the support structure of the probe is altered from the fundamental vibration frequency. This can be accounted for by the interaction forces effective between the tip and the substrate surface. This alters fundamental frequency hereinafter referred to as the contact resonant frequency. An advantage associated with this feature is by the off-resonance operation, specialized feedback schemes, need not be used.

The present invention provides a method wherein the modulation step, the magnitude of the load force, is modulated by applying an electrostatic potential between the probe and a counter-electrode, the magnitude of the electrostatic potential varied at the modulation frequency. This configuration offers the advantage of simplicity of implementation. The positioning of the counter-electrode relative to the substrate and/or probe is chosen to accommodate fragile handling issues.

The present invention provides a method wherein the modulation step, the magnitude of the load force, is modulated by mechanically vibrating at least a part of the support structure at the modulation frequency. This can be implemented by a piezoelectric element coupled to the support structure and/or incorporated into the body of the support structure. Apart from providing the ability to exploit the advantages associated with the piezoelectric technology for the modulation, there is an advantage of simplicity of implementation.

The present invention provides a method where the magnitude of the load force can be is modulated by inducing a displacement of the substrate surface relative to the probe. This feature provides the advantage that the whole substrate needs not to be displaced, so less energy is dispensed.

The present invention provides the support structure comprising a mechanical spring. When the tip is in contact with the substrate surface, depending on the nature of the interaction forces therebetween (attractive or repulsive), the tip can be displaced relative to the substrate surface in a plane substantially perpendicular thereto. By monitoring this displacement, the modulation of the loading force applied to the probe can be measured and controlled. However, since the interaction forces may be typically on the order of 1 nN to 1 μN, the tip-displacement is also comparably small and may be difficult to detect. In a preferred embodiment of the present invention, the probe is mounted on a support structure, which is a mechanical spring. In this case, the tip displacement causes a comparably larger change in specific characteristics of the mechanical spring. These changes are more reliably detected. In another preferred embodiment of the invention support structure is a cantilever spring. However, the present invention is not restricted thereto and any other appropriate force sensor may be used.

The present invention provides a substrate chosen to be comprised one of a: polymer, magnetic, ferroelectric and phase-change material or mixture thereof. This feature provides the advantage of versatility since a wide variety of materials may be investigated without substantial changes to the configuration of an embodiment of the present invention.

The present invention provides a method where the probe is scanned relative to the substrate surface. Thus, an embodiment of the present invention is applicable for different purposes such as patterning a surface with nanometer-sized dimensions, henceforth referred to as nanopatterning, lithography, imaging, etc. In this embodiment the reduced tip wear is desirable for improved reliability, performance and probe lifetime.

The probe is scanned relative to the substrate surface and the modulation frequency is preferably chosen to be $\geq v/a$ where v is a scanning velocity and a is an atomic/molecular length scale. The potential energy barrier that has to be scaled by an atom in the tip so that it interacts with a corresponding atom in the substrate surface at a next scan point is lowered by modulating the magnitude of the load force at the modulation frequency. This is advantageous because the probability of the atom remaining locked in an attractive interaction with an atom in the substrate surface at a given scan point is reduced. Thus, the probability of it physically displaced from the tip during scanning is reduced when displacement would otherwise contribute to tip wear. By operating at a modulation frequency that is chosen to exceed v/a, scanning can be performed faster without a trade off on the tip-wear of the probe. This may also result in higher data rates.

The present invention provides an apparatus wherein the probe is one in an array of probes. When these probes are implemented in an array used for scanning probe microscopy and/or its applications, each of the probes can be subjected to different wear rates. In order to use the tapping mode of operation for alleviating this problem, the sensing bandwidth must be tuned to the resonant frequency of the probes in the array. However, this is considered to vary from probe to probe even if they have the same design specifications and/or have been made in the same fabrication batch. Thus, achieving reduced tip-wear rates with the tapping mode may pose design and technical complexities.

By contrast, the present invention is not limited by the characteristics of the individual probes in the array. Instead modulating the load force applied to the probes in the array at the modulation frequency can be used to achieve reduced wear of their tips.

The present invention provides an array of probes and substrate, as part of a data-storage device. In this case, the array of probes may be applied for performing a read and/or write and/or erase function of data. The data is stored in the substrate surface with which the probe interacts. The advantages of reliability, improved performance, and lifetime may be gained due to the reduced tip wear with an embodiment of the present invention.

Desirably, an environment of the probe and the substrate is substantially maintained at a humidity of $\leq 10\%$ relative humidity as the presence of water may contribute to the wear-rate of the tip. Modulation of the magnitude of the load force applied to the probe is done with the humidity of this environment being maintained at $\leq 10\%$ relative humidity in an embodiment of the present invention. Experimental data demonstrating the reduced tip-wear obtained with this feature as compared to operation in, for example, ambient humidity conditions, i.e. 35-55% relative humidity will be discussed here below.

The present invention provides a method of reducing the wear of a tip of a probe when the tip is in contact with a surface of a substrate, the probe being mounted on a support structure, the method comprising: a loading step in which a load force is applied to the probe thereby to cause the tip to be maintained substantially in contact with the substrate surface, and a humidity-maintenance step in which an environment of the probe and the substrate is substantially maintained at a humidity of $\leq 5\%$ relative humidity. Experimental data demonstrating the reduced tip-wear obtained with this feature as compared to operation in ambient humidity conditions, i.e. 35-55% relative humidity will be discussed below.

The present invention provides a data storage device comprising: at least one probe mounted on a support structure; a data storage medium for storing data, the data storage medium being arranged so that a surface thereof is in contact with a tip of the probe when the device is in use, and a modulator operable to modulate the magnitude of a load force applied to the probe at a modulation frequency when the device is in use, the modulation frequency being greater than a fundamental vibration frequency of the support structure on which the probe is mounted.

The present invention provides a data storage device comprising: at least one probe mounted on a support structure; a data storage medium for storing data, the data storage medium being arranged so that a surface thereof is in contact with a tip of the probe when the device is in use, wherein, when the device is in use, an environment of the probe and the substrate is substantially maintained at a humidity of $\leq 5\%$ relative humidity.

Any disclosed embodiment may be combined with one or several of the other embodiments shown and/or described. This is also possible for one or more features of the embodiments.

Any feature of one aspect of the invention may be applied to another aspect of the invention and vice versa.

BRIEF DESCRIPTION OF THE DRAWINGS

FIG. 7 shows scanning electro-micrograph (SEM) photos of a tip before and after scanning in contact with a substrate surface;

DETAILED DESCRIPTION OF THE PREFERRED EMBODIMENTS

Figure 1:
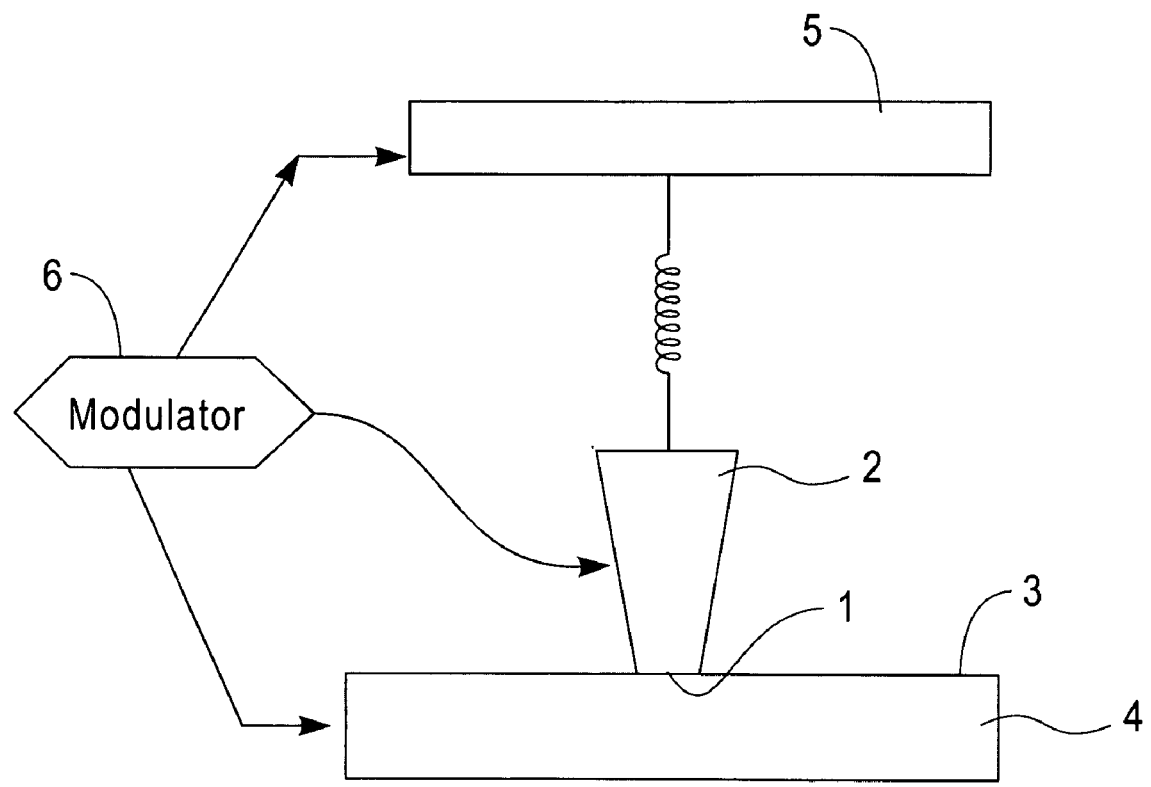
FIG. 1 schematically illustrates the experimental configuration of an embodiment of the present invention.

In the description of preferred embodiments the same reference numbers or signs are consistently used to denote the same parts labeled in the drawings.

Reference is now made to FIG. 1, which illustrates the experimental configuration of an embodiment of the present invention in order to achieve the reduced wear of a tip 1 of a probe 2 when in contact with a surface 3 of a substrate 4. The substrate 4 may comprise one or more layers; it may be chosen to comprise a polymer, magnetic, ferroelectric or phase-change material. In the present case, a material whose electrical and/or optical properties are modifiable by altering the phase thereof by, for example, thermal treatment is considered to be a phase-change material.

In a loading step, a load force is applied to the probe 2 so that the tip 1 is brought into and maintained in contact with the substrate surface 3. This may, for example, be done by the application of an electrostatic potential between the probe 2 and the substrate 4.

Modulation:

In one embodiment of the present invention, a modulating step is applied where the magnitude of the load force is modulated at a modulation frequency, which is chosen to be greater than a fundamental vibration frequency of the support structure 5 on which the probe 2 is mounted. For example, the modulation frequency is chosen to be at least ten times greater than the magnitude of the fundamental vibration frequency. In a preferred embodiment, the modulation frequency is chosen to be greater than the contact resonant frequency of the support structure 5, which is the resonant frequency of the support structure 5 when the tip 1 of the probe 2 is in contact with the substrate surface 3. In an embodiment of the present invention, the amplitude of the modulation may be chosen to be approximately 0.1 to 1 times the loading force, for example. The present invention is however, not limited to such values for the modulation amplitudes and, indeed, other appropriate choices may be made to suit the domain in which the present invention is applied, for example.

The modulation step is performed by a modulator 6, which may be implemented in different ways as generally depicted in FIG. 1.

Figure 2:
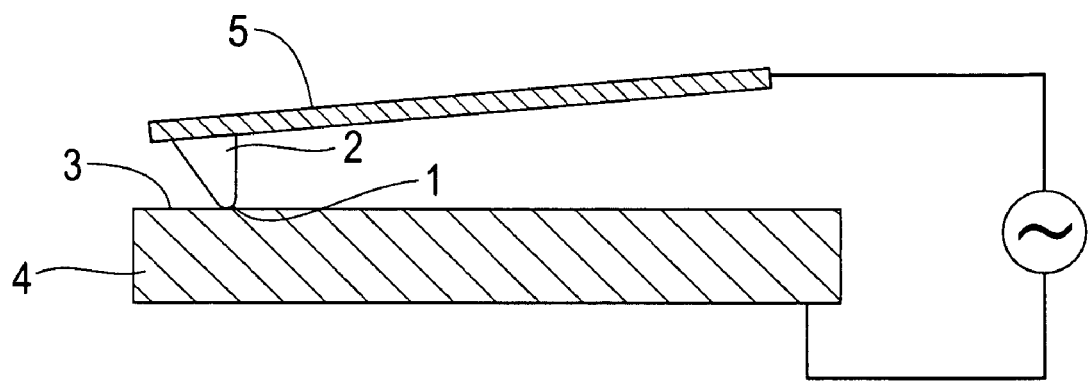
FIG. 2 schematically illustrates one implementation of the modulator.

In one implementation of the modulator 6, an electrostatic potential is applied between the probe 2 and a counter-electrode, the magnitude of the electrostatic potential being varied at the modulation frequency. In this case, the support structure 5 and/or the probe 2 are chosen to comprise a conductive material. The counter-electrode may be implemented as being part of the support structure 5 on which the probe 2 is mounted or the substrate 4. FIG. 2 depicts the case where the substrate 4 comprises the counter-electrode. Although, the support structure 5 is shown to be a cantilever spring in FIG. 2, the present invention is not limited thereto and any appropriate force sensor/mechanical spring may be used therefore.

Figure 3:
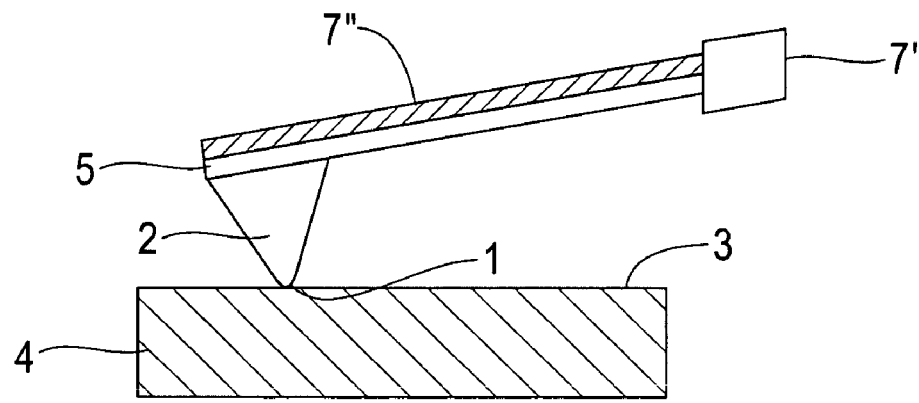
FIG. 3 schematically illustrates another implementation of the modulator.
Figure 4:
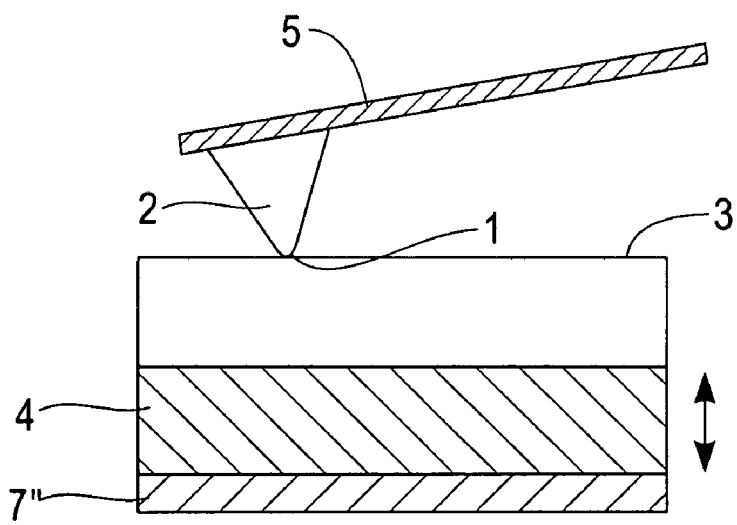
FIG. 4 schematically illustrates an alternative to the implementation shown in FIG. 3.

FIG. 3 shows another implementation of the modulator 6 where the magnitude of the load force is modulated by mechanically vibrating at least a part of the support structure 5 at the modulation frequency. This may be done by inducing mechanical vibration in the support structure 5 either by coupling it to a piezoelectric actuator 7' and/or providing a layer 7" of piezoelectric material in some region of the support structure 5 with dedicated circuitry to perform the modulation. In an alternative implementation, the substrate 4 is mechanically vibrated. As shown in FIG. 4, this may be done by providing the layer 7" of piezoelectric material under the substrate 4.

Figure 5:
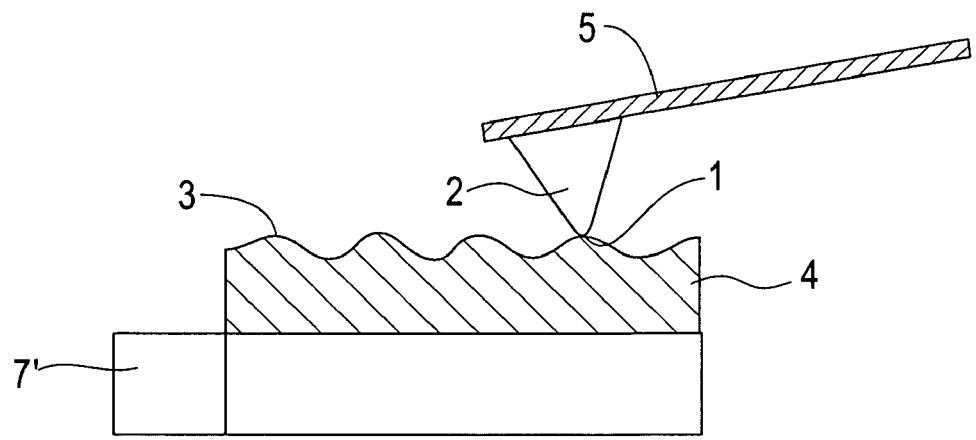
FIG. 5 schematically illustrates yet another implementation of the modulator.

FIG. 5 shows yet another implementation of the modulator 6 where the modulation is done by inducing a displacement of the substrate surface 3 relative to the probe 2. This may, for example, be effectuated by a surface acoustic wave such as that produced by the ultrasonic actuation of the substrate 4 or a part thereof. As shown in FIG. 5, the latter may comprise a layer of the substrate 4, the probe 2 interacting with that layer via a surface 3 thereof.

The modulator 6 may, of course, also be implemented with any appropriate combination of the above-described implementations.

Humidity:

In another embodiment of the present invention, the above-described loading step is conducted for maintenance of an environment/atmosphere of the probe 2 and the substrate 4 at a humidity of $\leq 10\%$ relative humidity (RH) and, more preferably, $\leq 5$ relative humidity. Other preferable values for the humidity environment in an embodiment of the present invention are: $\leq 0.1\%$ RH, 5 parts per million (ppm) of water and 1 ppm of water, respectively.

Experimental data demonstrating the reduced tip-wear obtained with this embodiment of the present invention as compared to operation in ambient humidity conditions, i.e. 35-55% relative humidity will be discussed here below.

Modulation-Humidity Combination:

The embodiments of the present invention and features thereof described hereinabove with respect to modulation of the load force applied to the probe 2 and controlling the humidity environment of the probe 2 and substrate 4 can be combined in a further embodiment of the present invention. The experimental data showing the further improvement in tip-wear results with such a combination compared to operating in ambient humidity conditions and/or for only controlling the humidity environment of the probe and the substrate, for example, at 2 ppm of water will be discussed here below.

Experimental Results:

In order to demonstrate the possibility of reducing tip-wear with an embodiment of the present invention, some experimental results are discussed here below. In all of the cases shown, the substrate was a silicon substrate with a polymer layer coated thereon.

Reference is made to FIGS. 7*a* and 7*b*, which are SEM photos of a tip 1 of a probe 2 before and after it was scanned in contact with the substrate surface 3. Scanning was performed for: the application of a load force of <5 nN; a scanning velocity of approximately 50 μm/s; scanning back and forth over the substrate surface 3 over a distance of approximately 13 m and ambient humidity conditions of between 35-55% RH. The wear-volume of the tip 1 after scanning was estimated using pi $r^2$ h×/3 where h and r are, respectively, the change in height of the tip and the tip-radius after scanning. In this case, h and r were estimated as being 130 nm and 34.5 nm, respectively. Thus, the wear-volume was estimated to be 1.62E5 $nm^3$. To better illustrate the results, schematic illustrations corresponding to the SEM photos shown in FIGS. 7*a* and 7*b* are respectively shown in FIGS. 7*c* and 7*d*. The wear-rate of the tip is also estimated from the wear-volume/scanning distance. In the present case, this wear-rate was found to be 1.25E4 $nm^3/m$.

Figure 8A:
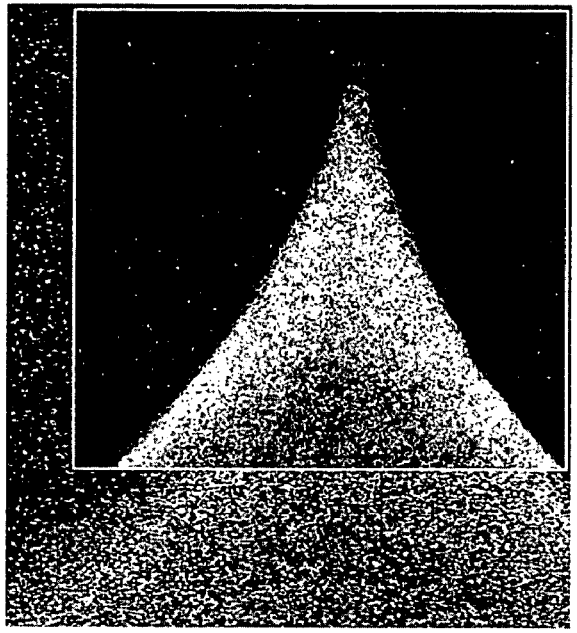
FIGS. 8 and 9 show SEM photos of a tip before and after scanning relative to a substrate surface with embodiments of the present invention.
Figure 8B:
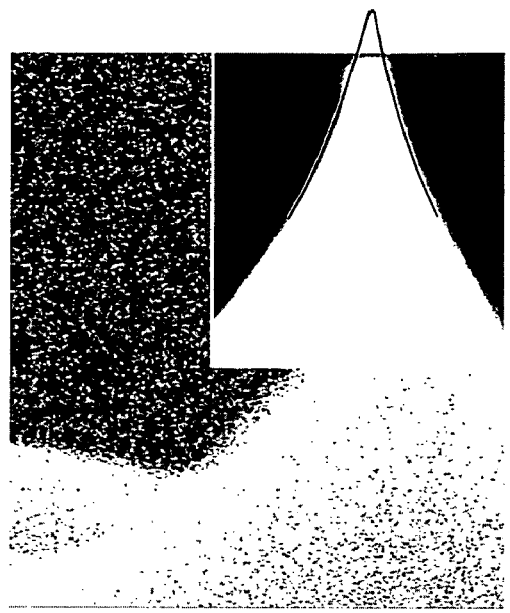
Figure 8C:
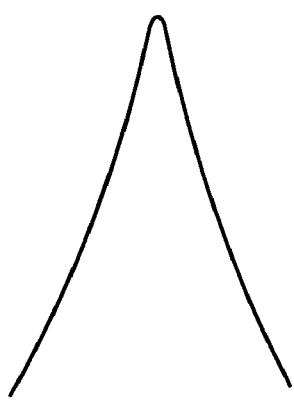
Figure 8D:
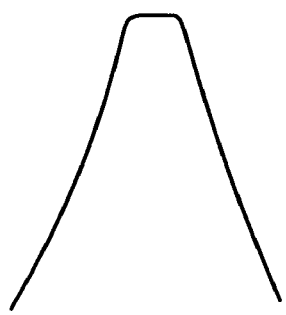

For the sake of comparison with an embodiment of the present invention in which the environment of the probe 2 and the substrate 4 was dry nitrogen gas maintained at a humidity of <2 ppm of water molecules, reference is now made to FIGS. 8*a* and 8*b*, which show tip-wear before and after scanning of the probe 2 with its tip 1 in contact with the substrate surface 3. Scanning was performed for: the application of a load force of <5 nN; a scanning velocity of approximately 1.5 mm/s and scanning back and forth over the substrate surface 3 over a distance of approximately 750 m. In this case, h and r were estimated as being 56 nm and 16 nm, respectively. Thus, the wear-volume was estimated to be 1.5E4 $nm^3$, which is an order of magnitude improvement over the scenario shown in FIGS. 7*a* and 7*b*. To better illustrate the results, schematic illustrations corresponding to the SEM photos shown in FIGS. 8*a* and 8*b* are respectively shown in FIGS. 8*c* and 8*d*. In the present case, the wear-rate was found to be approximately 20 $nm^3/m$, which is close to three orders of magnitude improvement over the scenario shown in FIGS. 7*a* and 7*b*.

Figure 9A:
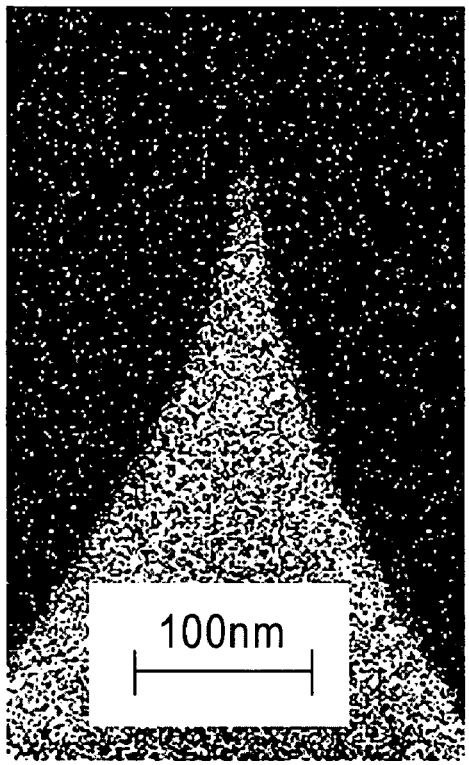
Figure 9B:
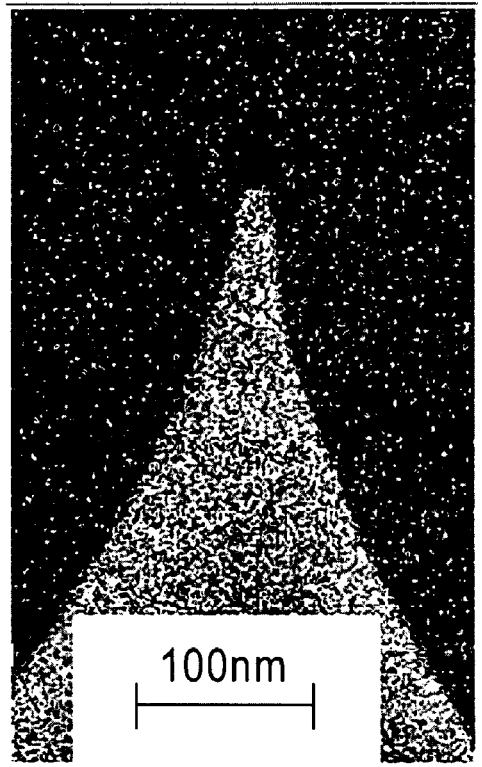
Figure 9C:
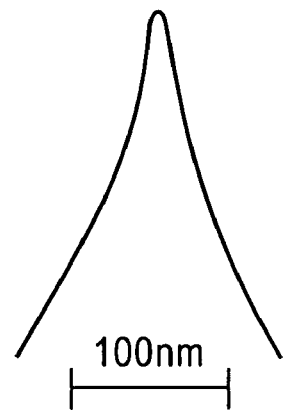
Figure 9D:
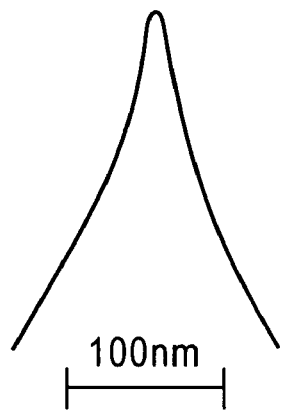

For the sake of comparison with a further embodiment of the present invention, hereinbefore discussed as the modulation-humidity combination, reference is now made to FIGS. 9*a* and 9*b*. In this case, a load force of approximately 5 nN was applied to the probe 2 for scanning its tip 1 in contact with the substrate surface 3. The load force was modulated at a modulation frequency of 500 kHz by the application of a 5V sinusoidal voltage signal to the substrate 4. The environment of the probe 2 and the substrate 4 was dry nitrogen gas maintained at a humidity of <2 ppm of water molecules. Scanning was performed for: a scanning velocity of approximately 1.5 mm/s and scanning back and forth over the substrate surface 3 over a distance of approximately 700 m. In this case, h and r were estimated as being 8.4 nm and 4.5 nm, respectively. Thus, the wear-volume was estimated to be 178 $nm^3$, which is a considerable improvement over any of the previous results. To better illustrate the results, schematic illustrations corresponding to the SEM photos shown in FIGS. 9*a* and 9*b* are respectively shown in FIGS. 9*c* and 9*d*. Here, the wear-rate was found to be approximately 0.25 $nm^3/m$, which is also a considerable improvement over any of the previously-discussed results.

TABLE 1

Summary of results

| Environment | Scan Distance (m) | Wear Volume ($nm^3$) | Wear Rate ($nm^3/m$) |
|---|---|---|---|
| Ambient Humidity (RH = 35-55%) | 13 | 162000 | 12461 |
| <2 ppm water | 750 | 15000 | 20 |
| <2 ppm water + modulating load force | 700 | ~178 | <0.25 |

In order to gain an appreciation of the trends in the wear behavior of the tip in the above experiments, adhesion data was also collected. This was done by measuring the adhesion force between the tip 1 and the substrate surface 3, this being done for the duration of the scan distance and by measuring the maximum force asserted on the tip 1 when pulled off the substrate surface 3. Since the adhesion force is considered to be proportional to the tip diameter, tip-wear may be estimated from the adhesion data.

Figure 10:
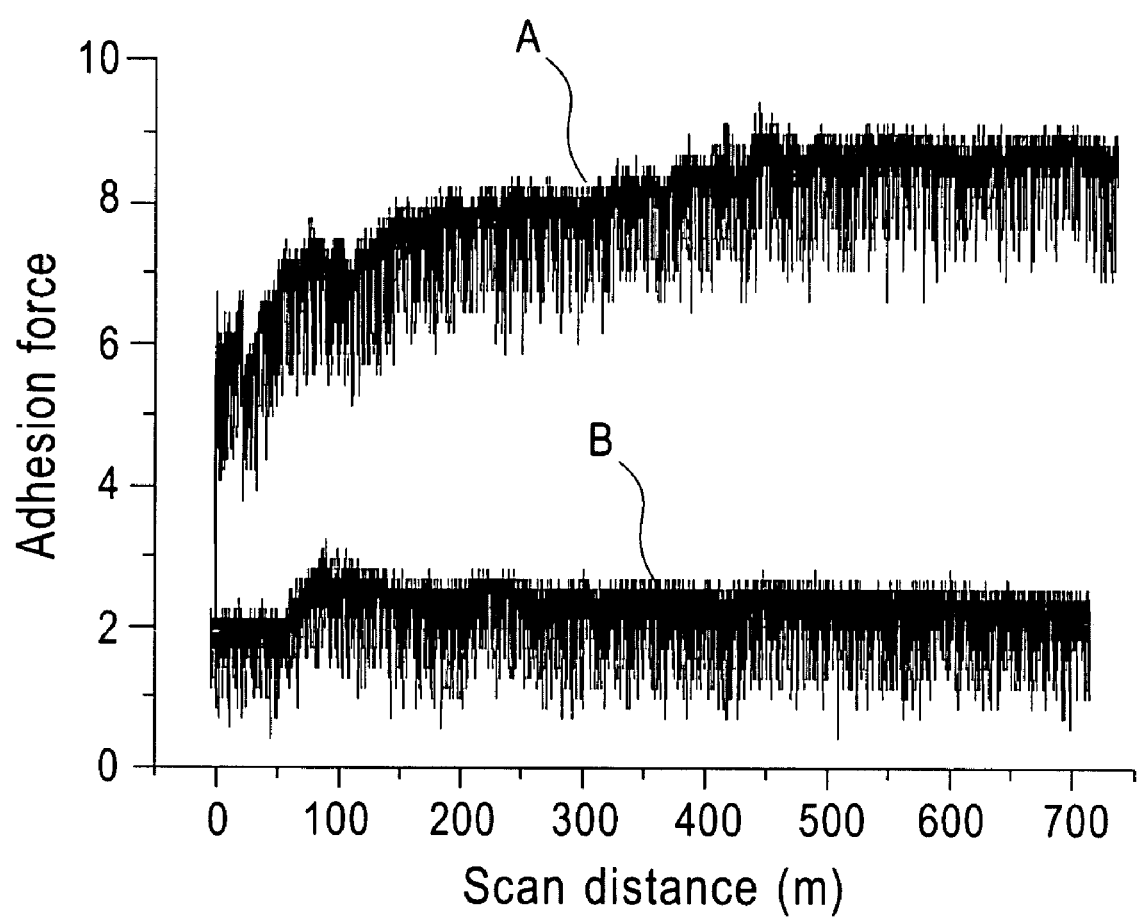
FIG. 10 shows adhesion data corresponding to the results shown in FIGS. 8 and 9.

FIG. 10 shows such adhesion data where plot A corresponds to the results of FIG. 8, i.e. where the humidity environment was controlled, and plot B corresponds to the results of FIG. 9, i.e. where the modulation-humidity combination was used. As can be seen from plot B, in the case of the experiment being conducted using the modulation-humidity combination embodiment of the present invention, after some initial change of the tip 1, the adhesion force remained unchanged. This is interpreted as the wear apparently coming to a halt or being reduced to a value below the resolution limit of the experiment.

Application:

As briefly discussed above, an embodiment of the present invention may be used in scanning probe microscopy and/or its applications where reduction of tip-wear may be desired. In any of the discussed examples, the probe 2 may be implemented by itself or in an array of probes scanned relative to the substrate surface 3.

Data-Storage Devices:

An embodiment of the present invention can be used in probe-based data storage devices. In this case, the substrate 4 performs the function of a data storage medium and stores data. The probe 2 performs a read and/or write and/or erase function of the stored data.

Figure 6:
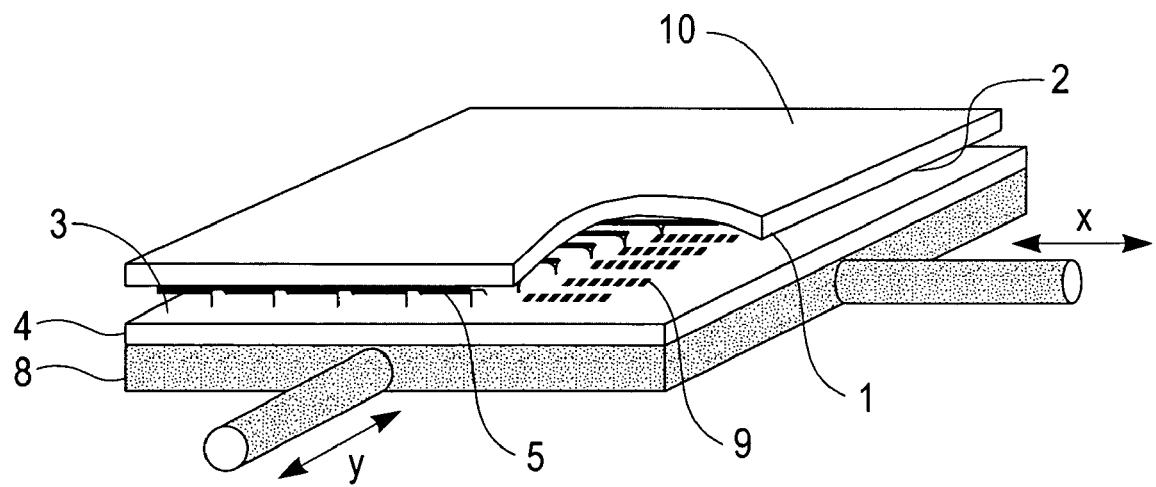
FIG. 6 schematically illustrates a thermo-mechanical probe-based device in which an embodiment of the present invention may find application.

Thermo-Mechanical Probe Storage Devices:

An embodiment of the present invention is particularly applicable to thermo-mechanical probe storage devices such as that disclosed in, "The Millipede—more than 1,000 tips for future AFM data storage" by P. Vettiger et al., IBM Journal Research Development, Vol. 44, No. 3, March 2000. As shown in FIG. 6, such a device has read- and write-functions based on a mechanical x, y scanning of a data storage medium 4 with an array 10 of probes 2 each having a tip 1. The probes 2 operate in parallel with each probe 2 scanning, during operation, an associated field of the data storage medium 4. The data storage medium 4 comprises a polymer layer and may be provided on a support layer 8. The tips 1, which each have a diameter of between 20 nm to 40 nm, are moved across a surface 3 of the polymer layer in a contact mode. The contact mode is achieved by applying a load force to the probes 2 so that the tips 1 of the probes 2 can touch the surface 3 of the polymer layer. For this purpose, the probes 2 are mounted on cantilevers 5. Bits are represented by indentation marks 9 or non-indentation marks in the polymer layer. The cantilevers 5 respond to these topographic changes while they are moved across the surface 3 of the polymer layer during operation of the device in read/write mode.

Indentation marks 9 are formed on the polymer layer by thermo-mechanical recording. This is achieved by heating a respective probe 2 with a current or voltage pulse by a dedicated heater for the writing/formation of the indentation marks 9. The probe 2 is heated during the contact mode in a way that the polymer layer is softened locally where it is contacted by the tip 1. The result is an indentation 9, for example, having a nanoscale diameter comparable to the diameter of the tip 1 that is used in its formation, being produced on the layer.

Reading is also accomplished by a thermo-mechanical concept. The probe 2 is heated up to a temperature that is not enough to soften the polymer layer as for writing data. The thermal sensing is based on the fact that the thermal conductance between the probe 2 and the data storage medium 4 changes when the probe 2 is moving in an indentation 9 as the heat transport is in this case more efficient. As a consequence of this, the temperature of the cantilever 5 decreases and hence, also its electrical resistance changes. This change of electrical resistance is then measured and serves as the measuring signal.

In an embodiment of the present invention applied to probe-based data storage applications, the modulation frequency is chosen to be $\geq v/a$ where v is a scanning velocity and a is an atomic/molecular length scale being on the order of $10^{-9}$ m and $10^{-10}$ m. In the specific case of thermo-mechanical probe storage devices, the scanning velocity, v, can be chosen to be between approximately 1 to 10 mm/s, for example. To maintain the humidity environment according to an embodiment of the present invention, the device may be hermetically packaged and sealed.

Ferro-Electric Media Based Probe Storage Devices:

In such devices, the data storage medium 4 comprises a ferro-electric material, such as PZT (lead zirconate titanate) for example. The probe 2 comprising a conductive material is brought into contact via its tip 1 with the data storage medium 4. This is done by the application of a load force to the probe 2. By applying an electrical potential between the probe 2 and the data storage medium 4, the polarization of the data storage medium 4 can be locally switched between two states where it is contacted by the tip 1. For read-back, either the electrical field or the charge can be sensed.

Phase-Change Media Based Probe Storage Devices:

In this case, the probe 2 is chosen to have conductive properties and is brought into contact with the data storage medium 4, which comprises a phase-change material. By applying a current through the probe 2 and the data storage medium 4, the latter can be heated locally under the tip 1 of the probe 2. Using this heat at a characteristic timescale, the phase-change material can be switched between two conductivity states, namely, a low-conducting amorphous state and a high-conducting crystalline state. The resistivity in the two states is applied for storing data and read-back of the data which is done by way of resistivity measurements.

Scanning-Probe Lithography:

In scanning probe lithography, a probe 2 is scanned over a surface 3 for changing the state of the surface 3 at predefined positions. Different lithographic techniques have been developed based on: the change of the surface 3, how it is achieved and/or the material of the surface 3. Examples of such techniques include: heating the probe 2 so that material is locally removed from the surface 3 where it is contacted by the tip 1 of the probe 2; where the surface 3 comprises a polymer-resist, locally exposing the resist by effectuating current-flow through the tip 1 of the electrically-conducting probe 2 into the polymer, and the so-called dip-pen nanolithography technique in which material is locally deposited on a surface 3 by way of the tip 1 when the probe 2 is scanned relative to the surface 3. Whilst these examples are non-exhaustive, they share in common with other probe-based lithographic techniques the problem of tip-wear of the probe 2. Thus, an embodiment of the present invention as hereinbefore described may be used advantageously in order to alleviate this problem.

Nano-Manipulation:

Another domain in which an embodiment of the present invention may be advantageously applied is where a scanning probe is operated to position nanometer-sized objects, such as, for example, chemically-active species, at predefined positions on a surface.

Scanning-Probe Based Metrology:

A further domain in which an embodiment of the present invention may be applied is in scanning-probe based metrology where a scanning probe is operated to obtain a topographical image of a surface or to scan a sensor in contact with a surface to make local measurements, for example, to measure local electrical properties.

The present invention has been described above purely by way of example and modifications of details can be made within the scope of the invention.

In an embodiment of the present invention, the tip 1 of the probe 2 comprises any part of the apex of the probe 2.

Each feature disclosed in the description, and where appropriate, the claims and drawings may be provided independently or in any appropriate combination.

We claim:

1. A method of reducing the wear of a tip of a probe selected from an array of probes of a data storage device when the tip is in contact with a surface of a substrate wherein the probe is mounted on a mechanical spring, the method comprising:
    loading where a load force is applied to the probe thereby to cause the tip to be maintained substantially in contact with the substrate surface; wherein the substantial contact includes periodic moments of sustained contact interspersed with periodic moments of no contact, and said substrate is selected from a group of materials comprising: a polymer, a magnetic material, a ferroelectric material, and a phase-change material;
    modulating the magnitude of the load force at a modulation frequency, the modulating regulating the periodic moments of sustained contact and the periodic moments of no contact, the modulation frequency being chosen to be greater than a fundamental vibration frequency of the spring on which the probe is mounted and said modulation frequency is chosen to be greater than a contact resonant frequency of the spring, which is the resonant frequency of the spring when the tip of the probe is in contact with the substrate surface;

modulating the magnitude of the load force by inducing a displacement of the substrate surface relative to the probe and said probe is scanned relative to the substrate surface;

applying an electrostatic potential between the probe and a counter-electrode to modulate said load force, wherein the probe is comprised of a conductive material and the substrate surface functions as the counter electrode and the modulation frequency is chosen to be $\geq v/a$ where v is a scanning velocity and a is an atomic/molecular length scale; wherein an environment of the probe and the substrate is substantially maintained at a humidity of $\leq 10\%$ relative humidity;

varying the magnitude of the electrostatic potential at the modulation frequency; and vibrating mechanically at least a part of the spring at the modulation frequency.

2. A method of reducing the wear of a tip of a probe when the tip is in contact with a surface of a substrate, the probe mounted on a support structure, the method comprising:

loading where a load force is applied to the probe thereby, to cause the tip to be maintained substantially in contact with the substrate surface;

maintaining a humid environment, where said environment of the probe and the substrate is substantially maintained at a humidity of $\leq 5\%$ relative humidity;

modulating the magnitude of the load force at a modulation frequency;

choosing the modulation frequency be greater than a fundamental vibration frequency of the support structure on which the probe is mounted;

providing the modulation frequency to be greater than a contact being the resonant frequency of the support structure when the tip of the probe is in contact with the substrate surface; forming the substrate from a material selected from the group consisting of a polymer, magnetic, ferroelectric and phase-change material; and, scanning the probe relative to the substrate surface.

3. The method as claimed in claim 2 wherein the modulation frequency is chosen to be $\geq v/a$ where v is a scanning velocity and a is an atomic or a molecular length scale.

4. The method as claimed in claim 3, wherein the probe is part of an array of probes, and wherein the array of probes and the substrate comprise a part of a data-storage device.

5. A data storage device comprising:

at least one probe mounted on a support structure;

a data storage medium for storing data, the data storage medium being arranged so that a surface thereof is in contact with a tip of the probe when the device is in use, and a modulator operable to modulate the magnitude of a load force applied to the probe at modulation frequency when the device is in use, the modulation frequency being greater than a fundamental vibration frequency of the support structure on which the probe is mounted; wherein the modulator is operable to apply an electrostatic potential between the probe and a counter-electrode, the magnitude of the electrostatic potential being varied at the modulation frequency;

wherein the modulation frequency is chosen to be $\geq v/a$ where visa scanning velocity and a is an atomic/molecular length scale and the support structure comprises a mechanical spring;

wherein the data storage medium comprises one of a: polymer, magnetic, ferroelectric and phase-change material, and wherein the probe is one in an array of probes that is scanned relative to the data storage medium; and wherein an environment of the probe and the data storage medium is substantially maintained at a humidity of $\leq 10\%$ relative humidity.

6. The data storage device comprising:

at least one probe mounted on a support structure;

a data storage medium for storing data, the data storage medium being arranged so that a surface thereof is in contact with a tip of the probe when the device is in use;

wherein, when the device is in use, an environment of the probe and the data storage medium is substantially maintained at a humidity of $\leq 5\%$ relative humidity, and further comprising a modulator which, when the device is in use, is operable to modulate the magnitude of a load force applied to the probe at a modulation frequency, which is greater than a fundamental vibration frequency of the support structure on which the probe is mounted, and wherein the data storage medium comprises one of a polymer, magnetic, ferroelectric and phase-change material, and wherein the probe is one in an array of probes that is scanned relative to the data storage medium.

7. The A method of reducing the wear of a tip of a probe when the tip is in contact with a surface of a substrate, wherein the probe is mounted on a support structure, the method comprising:

loading where a load force is applied to the probe thereby to cause the tip to be maintained substantially in contact with the substrate surface; wherein the substantial contact includes periodic moments of sustained contact interspersed with periodic moments of no contact, and modulating the magnitude of the load force at a modulation frequency, the modulating regulating the periodic moments of sustained contact and the periodic moments of no contact, the modulation frequency being chosen to be greater than a fundamental vibration frequency of the support structure on which the probe is mounted; wherein the modulation frequency is chosen to be greater than a contact resonant frequency of the support structure, which is the resonant frequency of the support structure when the tip of the probe is in contact with the substrate surface;

modulating the magnitude of the load force;

applying an electrostatic potential between the probe and a counter-electrode to modulate said load force, wherein said electrostatic potential is caused by varied conductivity between the probe and the surface, and varying the magnitude of the electrostatic potential at the modulation frequency.

* * * * *